United States Patent
Fangeat et al.

(10) Patent No.: US 7,225,072 B2
(45) Date of Patent: May 29, 2007

(54) SYSTEM FOR CONTROLLING THE STABILITY OF A VEHICLE USING SEVERAL PREDICTIVE ALGORITHMS AND A SELECTION PROCESS

(75) Inventors: Nicolas Fangeat, Chamalieres (FR); Georges Levy, Tokyo (JP)

(73) Assignee: Michelin Recherche et Technique S.A., Granges-Paccot (CH)

( * ) Notice: Subject to any disclaimer, the term of this patent is extended or adjusted under 35 U.S.C. 154(b) by 137 days.

(21) Appl. No.: 11/039,675

(22) Filed: Jan. 18, 2005

(65) Prior Publication Data

US 2005/0187695 A1  Aug. 25, 2005

(30) Foreign Application Priority Data

Jan. 16, 2004  (FR)  .................................. 04 00422
May 27, 2004  (FR)  .................................. 04 05823

(51) Int. Cl.
*B60T 8/00* (2006.01)
*B60T 8/60* (2006.01)

(52) U.S. Cl. .......................... 701/71; 180/197; 303/146

(58) Field of Classification Search .................. 701/71, 701/70, 72, 74, 80, 73; 180/197; 303/146, 303/140, 147, 148, 149, 150, 151, 152

See application file for complete search history.

(56) References Cited

U.S. PATENT DOCUMENTS

| 3,980,346 A | 9/1976 | Leiber | 303/6 |
| 4,715,662 A | 12/1987 | van Zanten et al. | 303/109 |
| 4,794,538 A | 12/1988 | Cao et al. | 701/74 |
| 5,343,918 A | 9/1994 | Fontaine | 152/209.5 |

(Continued)

FOREIGN PATENT DOCUMENTS

DE  40 30 724 A1  2/1992

(Continued)

OTHER PUBLICATIONS

Grosch, K. A., "Determination of Friction and Wear Resistance of Tread Compounds—Part I: Wet Skid," Kautschuk and Gummi Kunststoffe, Jun. 1996, v49, n6, p. 432-441 (Abstract).

(Continued)

*Primary Examiner*—Dalena Tran
(74) *Attorney, Agent, or Firm*—Fitzpatrick, Cella, Harper & Scinto (57) ABSTRACT

System for controlling the stability of a vehicle, the system comprising means for imparting a longitudinal force to the tire and means for calculating a slip $G^{Opt}$ by determining the values of the coefficient of friction $\mu_i$, for each slip $G_i$ corresponding to successive levels "i", using in parallel "n" calculation algorithms each determining a target value of the slip making it possible thus to obtain as many target values $G^{Cn}$ as there are algorithms used, the system selecting the best of the target values $G^{Cn}$ as the optimum slip value $G^{Opt}$ by subjecting the "n" target values $G^{Cn}$ to comparisons aimed at eliminating the least likely target values, the comparisons being made on the basis of a function $f(\lambda)$ of a descriptor of the physical functioning of the rotation of the tire on the ground making it possible to calculate characteristic values. For example, one interesting characteristic value is the variation in G with respect to time.

39 Claims, 5 Drawing Sheets

U.S. PATENT DOCUMENTS

| | | | |
|---|---|---|---|
| 5,402,345 A | 3/1995 | Kost | 364/426.02 |
| 5,409,302 A | 4/1995 | Chabbert | 303/112 |
| 5,513,907 A | 5/1996 | Kiencke et al. | 303/150 |
| 5,641,212 A | 6/1997 | Sakai | 303/147 |
| 5,814,718 A | 9/1998 | Andresen et al. | 73/9 |
| 5,816,666 A | 10/1998 | Wiss | 303/113.4 |
| 6,015,192 A | 1/2000 | Fukumura | 303/140 |
| 6,089,680 A * | 7/2000 | Yoshioka et al. | 303/146 |
| 6,092,415 A | 7/2000 | Borenius et al. | 73/146.2 |
| 6,226,587 B1 * | 5/2001 | Tachihata et al. | 701/72 |
| 6,233,505 B1 | 5/2001 | Kranz et al. | 701/1 |
| 6,285,280 B1 | 9/2001 | Wang | 340/444 |
| 6,449,542 B1 | 9/2002 | Böttiger et al. | 701/41 |
| 6,473,682 B1 * | 10/2002 | Nakamura | 701/74 |
| 6,539,298 B2 * | 3/2003 | Inagaki et al. | 701/70 |
| 6,550,320 B1 | 4/2003 | Giustino | 73/146 |
| 6,659,570 B2 * | 12/2003 | Nakamura | 303/146 |
| 6,964,460 B2 * | 11/2005 | O'Dea | 303/139 |
| 2002/0010537 A1 | 1/2002 | Yamaguchi et al. | 701/80 |
| 2002/0111752 A1 | 8/2002 | Nakamura | 702/42 |
| 2004/0024514 A1 | 2/2004 | Levy et al. | 701/82 |
| 2004/0032165 A1 | 2/2004 | Levy et al. | 303/150 |
| 2004/0049303 A1 | 3/2004 | Levy et al. | 700/80 |
| 2004/0225423 A1 | 11/2004 | Carlson et al. | 701/36 |

FOREIGN PATENT DOCUMENTS

| | | |
|---|---|---|
| DE | 42 18 034 A1 | 9/1993 |
| DE | 43 29 745 C1 | 7/1994 |
| DE | 44 35 448 A1 | 4/1995 |
| DE | 101 28 675 A1 | 1/2002 |
| DE | 101 56 823 A1 | 6/2002 |
| EP | 0 716 948 A2 | 6/1996 |
| EP | 0 829 401 A2 | 3/1998 |
| EP | 1 000 838 A2 | 5/2000 |
| EP | 1 371 534 A1 | 12/2003 |
| FR | 2816402 | 5/2002 |
| FR | 2 840 867 | 12/2003 |
| WO | WO 01/36240 A1 | 5/2001 |
| WO | WO 01/76925 | 10/2001 |
| WO | WO 01/87647 | 11/2001 |

OTHER PUBLICATIONS

Yamazaki Shun'ichi., "The Determination of Tire Parameter for Real Time Estimation of Tire and Road Friction," Jidosha Gijutsukai Koenkai Maezurishu, 1997, No. 971, p. 165-168 (Abstract).

Sakai Tomotsugu "Investigation of Lambourn Wear Test Conditions to Evaluate Tire Wear Life," Toyota Motor Corp., Proceedings of the International Sessions JSME Spring Annual Meeting, 1996, vol. 73, p. 33-34 (Abstract).

* cited by examiner

SYSTEM FOR CONTROLLING THE STABILITY OF A VEHICLE USING SEVERAL PREDICTIVE ALGORITHMS AND A SELECTION PROCESS

CROSS-REFERENCE TO RELATED APPLICATIONS

This application claims benefit of French Patent Application No. 04/00422, filed Jan. 16, 2004, and French Patent Application No. 04/05823, filed May 27, 2004, both of which are incorporated herein by reference in their entirety.

BACKGROUND OF THE INVENTION

1. Field of the Invention

The present invention relates to vehicle stability control systems. In a particular application, the invention relates to systems aimed at preventing the locking of the wheels during hard braking, popularized by the term "ABS". More generally, the invention concerns all systems aimed at maintaining the vehicle on a stable path by acting automatically on actuators such as those determining a wheel driving or braking torque, or those determining the steering of one or more wheels, or even those concerning the suspension, where it is known that this also has an effect on the control of the path (for example active antiroll). In the particular application mentioned above, the actuators are the brakes on a wheel or the device imposing a driving torque on a wheel.

2. Description of Related Art

For information, the longitudinal coefficient of friction $\mu$ of the tire is the quotient of the longitudinal force divided by the vertical force applied, that is to say the load applied on the tire (in the simplified case of a pure braking force, and a person skilled in the art will easily know how to apply this more generally); the slip G on the tire is G–0% when there is no slip between the speed of the tire and the speed of the vehicle, that is to say if the tire is rolling freely, and G=100% if the tire is locked rotationally. Typically, according to the environment (the nature of the ground (asphalt, concrete), dry or wet (height of water), temperature and level of wear on the tire), the value of $\mu$ as a function of the slip G and the nature of the ground may vary enormously ($\mu_{max}$ equals approximately 0.15 on ice and approximately 1.2 on dry ground).

It is known that the braking of the vehicle will be all the more effective when it is managed to make the tread function at a slip G corresponding to the maximum value of the coefficient of friction (sometimes also referred to as the coefficient of adherence). The maximum value of the coefficient of friction is termed $\mu_{max}$. However, the average driver is not capable of tuning out the braking so as to satisfy this condition.

This why vehicle stability control systems have been developed, automatically modulating the braking force so as to aim at a predetermined slip target, and deemed to correspond to the maximum of the coefficient of friction.

In particular, U.S. Patent Application Publication No. 2004/0032165 A1, published Feb. 19, 2004, and which is incorporated herein by reference in its entirety, proposes a method of regulating the slip using a quantity called the "Invariant", which the research of the inventors made possible to discover, this quantity being called like this because it is substantially constant whatever the tire in question and whatever the adhesion of the ground on which the tire is rolling.

Though this method makes it possible to determine a slip target which is actually much closer to the real maximum coefficient of friction of the tire under actual rolling conditions, there do however exist cases where it is possible to determine an even better target for improving the effectiveness of the braking (or of the acceleration).

SUMMARY OF THE INVENTION

The invention proposes a vehicle stability control system using several predictive algorithms and a selection process.

In a general formulation, the invention proposes a vehicle stability control system in which a characteristic parameter Q of the functioning of a tire of the vehicle intended to roll on the ground varies as a function of a parameter P according to a particular law, an optimum value of the parameter P being imposed by a controller directly or indirectly so as to act on at least one of the elements chosen from the group comprising the rotation torque applied to the tire, the steering angle of the tire, the camber angle of the tire and the vertical force applied to the tire, in which the controller comprises means for:

determining estimations or measurements ($P_i$, $Q_i$) for successive levels "i" of values;

using in parallel "n" calculation algorithms each determining a target value for the parameter and thus obtaining as many target values $P^{Cn}$ as there are algorithms used, selecting as the optimum value of the parameter the best of the target values $P^{Cn}$ by subjecting the "n" target values $P^{Cn}$ to comparisons aimed at eliminating the least likely target values.

The result sought is to maintain the value of a parameter Q at a value chosen as being ideal in the situation of the vehicle at the time. In the present document, a detailed description is given of an application to the control of the slip of a tire, particularly during a braking maneuver or during a maneuver acting on the yawing of a vehicle (a function known by the term ABS in the first case or a function known by the name ESP in the second case). Finally, an application is mentioned aimed at controlling the path using actuators other than those acting on the torque at the wheels.

In a first application, the invention therefore proposes a vehicle stability control system in which the parameter P is the slip G on the tire and the characteristic parameter Q is the coefficient of friction $\mu$ of the tire, the system comprising means for imparting a longitudinal force to the tire, means of modulating the longitudinal force and means for calculating the slip parameter $G^{Opt}$ at each activation of the means for imparting a longitudinal force to the tire in the following manner:

determining the values of the coefficient of friction $\mu_i$, for each slip $G_i$ corresponding to successive levels "i" of the longitudinal force, using in parallel "n" calculation algorithms each determining a target value for the slip and thus obtaining as many target values $G^{Cn}$ as there are algorithms used, selecting as the optimum slip value $G^{Opt}$ the best of the target values $G^{Cn}$ by subjecting the "n" target values $G^{Cn}$ to comparisons aimed at eliminating the least likely target values.

The present invention therefore proposes, according to observations made at the very start of each torque variation maneuver (typically at the very start of each braking maneuver but this is valid also at the start of each acceleration or for other maneuvers such as turning), from observations (measurements or estimations), to calculate the target slip values according to several algorithms and to select from amongst these targets the optimum slip value finally adopted by the regulation of the slip. The result aimed at is therefore to maintain the value of the coefficient of friction of the tire at a value chosen as being ideal in the situation of the vehicle of the moment, for example at its maximum possible value.

The application of choice of the present invention lies in the control of the slipping of a wheel in braking. The entire following description in this case concerns a device for modulating the longitudinal force which acts on the braking control. It should be indicated once and for all that, in this case, the operations indicated above, and in more detail below, are initialized (i=0) at each start of a braking maneuver. However, if it is decided to apply the present invention to the control of the slipping of a wheel in acceleration, the device modulating the longitudinal force acts on the driving torque at the wheels and the operations indicated at each request for a variation in the driving torque greater than a predetermined torque threshold are initialized (i=0).

It should also be noted that, in the context of the present invention, it is of little importance whether the tread whose adhesion characteristic is processed is that of a pneumatic tire or a non-pneumatic elastic solid tire or a track. The terms "tread", "tire" or "pneumatic tire", "solid tire", "elastic tire", "track" or even "wheel" must be interpreted as equivalent. It should also be noted that the determination of the values of the coefficient of friction $\mu_i$ for each slip $G_i$ may be carried out by direct measurement or by estimation from other measurements or from the estimation of other quantities such as the force in the plane of the ground and the vertical load.

The selection of the optimum slip proceeds from a comparative evaluation between all the algorithms. For example, for each algorithm from 1 to n, after the acquisition of sufficient values $G_i$, a comparative assessment is made by calculating the absolute value of the relative difference between the target $G^{Cn}$ of the algorithm "n" and the target $G^{Cn-1}$ of the previous selection "n-1". Using a characteristic value ($\lambda$) of the physical functioning of the rotation of the tire on the ground, a tolerance range is chosen on the previously calculated difference and on the basis of this characteristic value. The selection proceeds as follows: if the difference lies in the tolerance range, select $G^{Cn}$ as the optimum slip value $G^{Opt}$; if the difference does not lie in the tolerance range, select $G^{Cn-1}$ as the optimum slip value $G^{Opt}$.

For the first choice, a preferred algorithm will have been determined experimentally, for example the algorithm giving statistically the target closest to the ideal target. This algorithm chosen for initiating the iterations gives a first selection for the target, that is to say a first reference value, and hence the designation of target $C^{Cn-1}$.

It is possible to adopt as the characteristic value $\lambda$ the variation in G with respect to time since this describes fairly well the type of ground involved; it is known that, on a ground with low adhesion, the wheel starts to lock very quickly and therefore the variation with respect to time will be great, and vice-versa.

The limits of the tolerance range are calculated by Boolean logic or by fuzzy logic or by any mathematical function.

The remainder of the description illustrates the invention used for selecting, according to circumstances, the most pertinent of three algorithms:

a first algorithm using the principle of the Invariant illustrated in the aforementioned patent application with regard to everything concerning the determination of the target slip by means of this principle, which in the present document will for convenience be referred to as the "Invariant algorithm", also designated "Invt";

a second algorithm, novel in itself, which will in the present document be referred to for convenience as "Average algorithm", also designated "Avg";

a third algorithm, novel in itself, which in the present document will for convenience be referred to as the "Wet algorithm", also designated "Wet".

DETAILED DESCRIPTION OF THE PREFERRED EMBODIMENTS

The "Invariant" Algorithm

Example 1 described in the aforementioned patent application (U.S. Patent Application Publication No. 2004/0032165 A1) will be consulted in the foregoing, that example relating to the automatic maintenance of the functioning of a tire on a vehicle at a certain coefficient of friction, for example at the maximum coefficient of friction $\mu_{max}$. The Invariant algorithm makes it possible in particular to control the slip G so as to maintain it at a predetermined optimum value $G^{Opt}$. The predetermined slip $G^{Opt}$ is more particularly, and non-limitingly, chosen so that the predetermined value of the coefficient of friction corresponds substantially to the value $\mu_{max}$. In this case, it is agreed that this particular optimum value should be called $G_{max}$. It is observed that the position of the maximum for this tire varies according to the ground. There exists an Invariant "Invt" common to these different grounds.

By applying the equation for determining the Invariant in the case of the analysis of the coefficient of friction as a function of the slip, the Invariant is calculated in particular in the following manner:

$$Invt = \frac{\frac{\mu}{G}(G_{max})}{\frac{\mu}{G}(p \cdot G_{max})},$$

with p having a positive value less than 1.

With regard to p, its value is preferably between 0.25 and 0.75, for example it is equal to 0.5, the reader being referred to the description of the aforementioned patent application with regard to the consequences of the choice of the value of p.

In this way there is obtained:

$$\frac{\frac{\mu}{G}(G = G_{\max})}{\frac{\mu}{G}(G = G_{\max}/2)} \approx 0.58$$

An Invariant "Invt" was introduced by proceeding with a processing of the data at a first value of the slip G, corresponding to the maximum of the coefficient of friction $\mu_{max}$, and at a second value corresponding to 50% of the first value, for example 50% of the previously mentioned slip. A first value of "Invt" can thus be derived therefrom.

Figure 5:
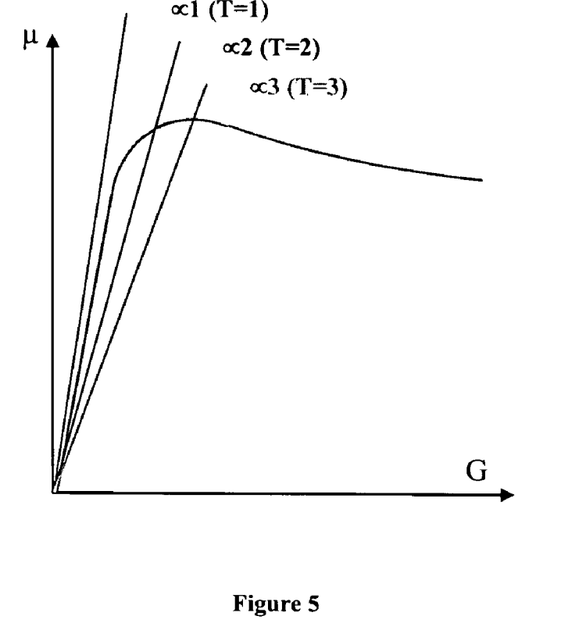
FIG. 5 illustrates the Invariant algorithm.

It is next necessary to proceed with the determination of the slope $\alpha_i$ of the curve $\mu_i=f(G_i)$ illustrated in FIG. 5. To do this direct calculation $\alpha_i=\mu_i/G_i$ is carried out, or a suitable regression is used, for example a linear regression.

For example, two particular coefficients $A^{Lin}$ and $B^{Lin}$ are calculated by the following linear regression, applied to "q" measurement or estimation points:

$$A^{Lin} = \frac{q \cdot \sum G \cdot \alpha - \sum G \cdot \sum \alpha}{q \cdot \sum G^2 - (\sum G)^2},$$

$$B^{Lin} = \frac{\sum \alpha \cdot \sum G^2 - \sum G \cdot \alpha \cdot \sum G}{q \cdot \sum G^2 - (\sum G)^2}$$

which gives the expression of the slope $\alpha = A^{Lin} \cdot G + B^{Lin}$

Next, $G^{Opt}$ is calculated in the following manner:

$$G^{Opt} = -\frac{B^{Lin}}{A^{Lin}} \cdot \frac{1-Invt}{1-p \cdot Invt},$$

Another well-suited regression is an exponential regression.

Thus a first algorithm, referred to as an "Invariant algorithm", performs the following operations:
  determining the slope $\alpha_i$ of the straight line passing through the origin and through $(G_i, \mu_i)$,
  calculating coefficients $A_P$ by direct calculation or by an appropriate regression from a sufficient number of pairs $(\alpha_i, G_i)$ so as to model a variation curve $\alpha_i=f(G_i, A_P)$,
  calculating a first target slip $G^{Cinvt}$ using a predetermined Invariant "Invt".

It has been seen that the Invariant "Invt" is equal to substantially 0.58. However, in practice, it is possible to use the Invariant "Invt" as a parameter for fine tuning the system.

Description of the "Average" Algorithm

The "Average" algorithm consists of detecting the change in the curvature of the curve $\mu(G)$. It is understood in fact that such a change reveals the proximity of the maximum adhesion. For this, the measurements or estimations are processed of the slip and coefficient of friction values associated with two regressions, one of which aims to model a variation curve which necessarily passes through the origin and the other one of which aims to model a variation curve which does not necessarily pass through the origin, that is to say whose first point is left free.

Thus a second algorithm performs the following operations:
  determining coefficients $A_{[avg/p]}$ by direct calculation or by an appropriate regression, from a sufficient number of pairs $(\mu_i, G_i)$, so as to model a first variation curve $\mu_i=f(G_i, A_{[avg/p]})$ necessarily including by convention the origin, and the pair or pairs $(\mu_i, G_i)$, in which $\mu_i$ is different from zero,
  determining an indicator of the average slope $\alpha_1$ of the first variation curve,
  determining coefficients $B_{[avg/p]}$ by direct calculation or by an appropriate regression, from a sufficient number of pairs $(\mu_i, G_i)$, so as to model a second variation curve $\mu_i=f(G_i, B_{[avg/p]})$ including the pair or pairs $(\mu_i, G_i)$, in which $\mu_i$ is different from zero,
  determining an indicator of the average slope $\alpha_2$ of the second variation curve,
  as long as the difference between $\alpha_1$ and $\alpha_2$ is less than a predetermined slope threshold, repeating the previous operations for each new acquisition of a pair of values $(G_i, \mu_i)$,
  as soon as the difference between $\alpha_1$ and $\alpha_2$ exceeds the predetermined slope threshold, determining a target slip $G^{Cavg}$ using at least the last pair of values $(G_i, \mu_i)$.

Preferably, a second condition is added causing the determination of the second target slip using at least the pair of values $(G_i, \mu_i)$, the second condition being as soon as $G_i$ exceeds a predetermined threshold, for example 15%.

Figure 6:
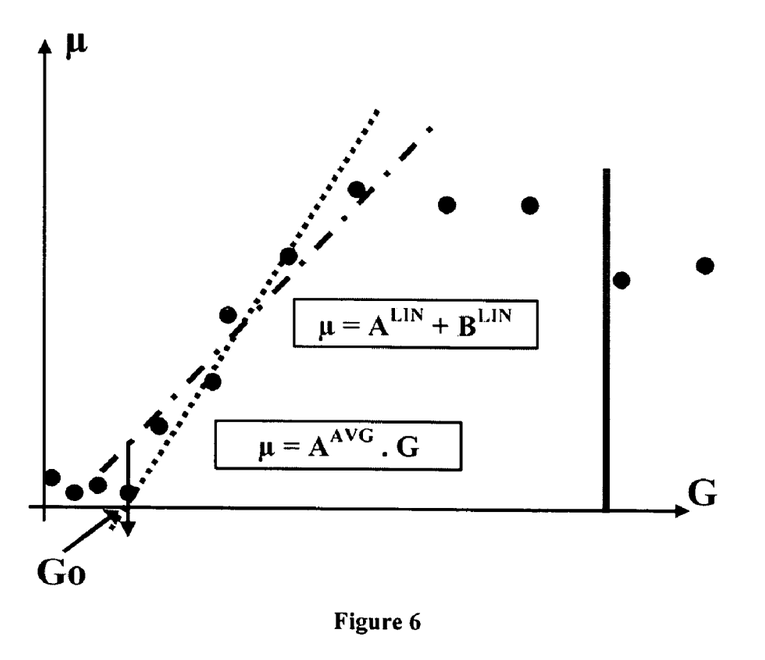
FIG. 6 illustrates the Average algorithm.

The use of linear regressions is particularly indicated. In this case, the difference between two linear regressions is looked at, as illustrated in FIG. 6. In this case,
  the first variation curve, depicted by a dotted line in FIG. 6, is a first straight line $\mu_i=A_{avg} \cdot G_i$, including by convention the origin (to within a correction $G_0$, a correction which will be explained later), and the pair or pairs $(\mu_i, G_i)$, obtained by a first linear regression calculating a first coefficient $A_{avg}$,
  the second variation curve, depicted in a dot and dash line in FIG. 6, is a second straight line $\mu_i=A_{lin} \cdot G_i + B_{lin}$ (the less vertical straight line) including the pair or pairs $(\mu_i, G_i)$, which are left free not to pass through the origin, and is obtained by a second linear regression calculating coefficients $A_{lin}$ and $B_{lin}$ (which does not exclude a correction $G_0$ which will be explained later).

Naturally, since it is a case of linear regressions, the indicators $\alpha_1$ and $\alpha_2$ are directly the respective slopes $A_{avg}$ and $A_{lin}$ of each of the straight lines.

It has been determined experimentally that, in the case of modeling by straight lines (linear regressions), the predetermined slope threshold for the difference between $\alpha_1$ and $\alpha_2$ is preferably around 30%.

In the end, the target slip $G^{Cavg}$ adopted can quite simply be equal to the last value $G_i$. As an alternative and more precisely, the target slip $$G^{Cavg} = \beta \cdot \frac{\mu^{MAX}}{A^{AVG}}$$

is determined with $\beta$ a fine-tuning parameter. When in the present document a fine-tuning parameter is spoken of, this means that, even if there exists for this parameter a value or a range of values representing a physical reality, it is possible in practice to use this parameter arbitrarily as a fine-tuning knob for the practical functioning of the system for controlling the stability of a vehicle, that is to say a parameter used in the fine tuning of the system. It can be added simply that the parameter β represents an analogy with the Invariant, which results for β in a value of approximately 1.04 to be compared with the value 0.58 for the Invariant.

As will be seen later, without this being limiting, it is proposed that the Average algorithm be chosen as the reference value for determining the target slip since it has been found experimentally that it is the one which is the most robust for all types of tire and all types of ground. It is therefore this algorithm which serves to validate choices of target based on the other algorithms. An example of a process of choice between the algorithms is described at the end of the present document.

Description of the "Wet" Algorithm

As its name indicates, this algorithm is particularly designed for calculating a target on wet ground (in fact all grounds of low adhesion). This is because, on this type of ground, the wheel locks very quickly and there is a risk of perceiving too late that the maximum of the curve μ(G) has been exceeded.

The principle of this algorithm consists of studying the change in the derivative of the slip as a function of time. If an excessively rapid change is noted, that is to say in fact an excessively rapid change in the slip, it can be presumed that the system is no longer stable since the slip corresponding to the maximum adhesion has been or is about to be exceeded. This algorithm therefore consists of:

- as the values of $G_i$ are acquired, calculating the variation in G with respect to time,
- as long as the variation is above a low threshold, calculating coefficients $A_{[wet, p]}$ by direct calculation or by an appropriate regression so as to model the variation in G with respect to time by a variation curve which is a function of $(G_i, A_{[wet, p]})$,
- as soon as the variation is above a high threshold, determining a third target slip $G^{Cwet}$ using at least the last values of $A_{[wet, p]}$.

The algorithm is preferably used only with slip values above 4%. Advantageously, the low threshold is around 100% per second and the second high threshold is around 300% per second.

A simple application of this algorithm uses a linear regression, which means that coefficients $A_{wet}$ and $B_{wet}$ are calculated in the following manner:

$$\frac{dG}{dt} = A^{WET} \cdot G + B^{WET}$$

and the third target slip $G^{Cwet}$ is therefore determined as follows:

$$G^{Cwet} = \frac{dG\_tgt - B^{WET}}{A^{WET}}.$$

Figure 7:
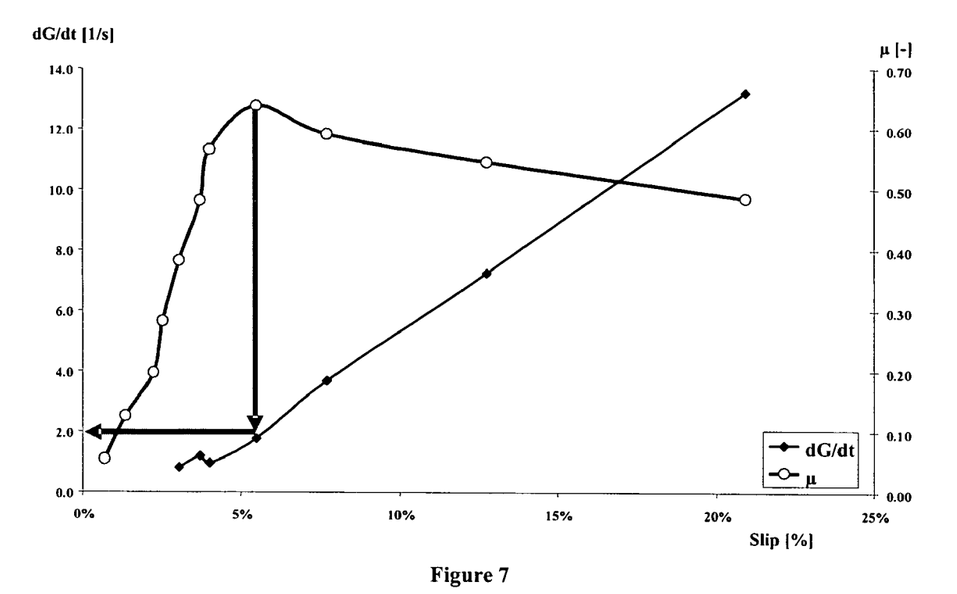
FIG. 7 illustrates the Wet algorithm.

Although an experimental value of 200% per second for the parameter "dG_tgt" has given good results as shown in FIG. 7, it is possible in practice to use this parameter arbitrarily as a fine-tuning button for the practical functioning of the vehicle stability control system, just as mentioned with regard to the β and Invariant parameters.

Suggestions for Improvements Concerning the Initial Data Acquisitions

Figure 2:
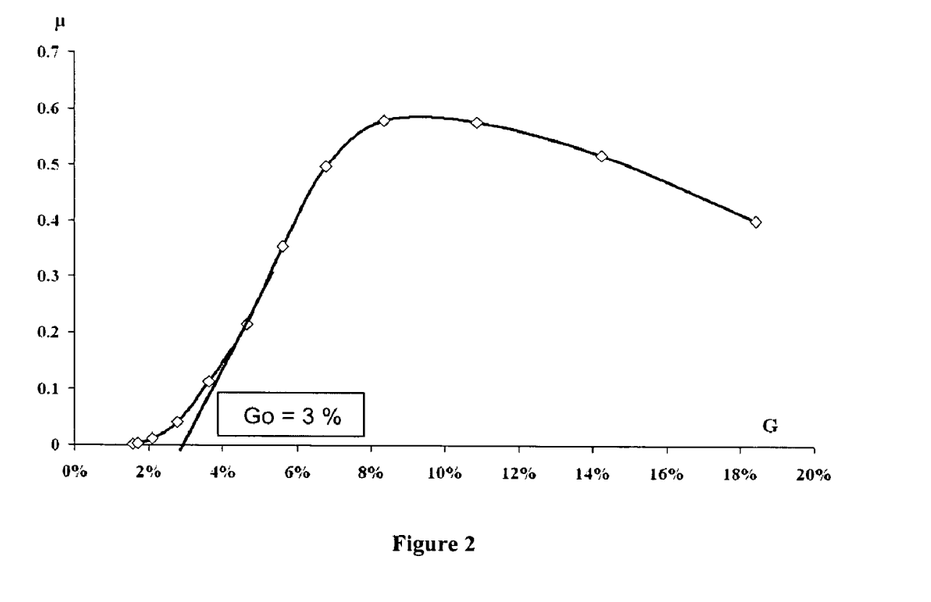
FIG. 2 illustrates a particular processing of the first acquisitions of measurements or estimations.
Figure 3:
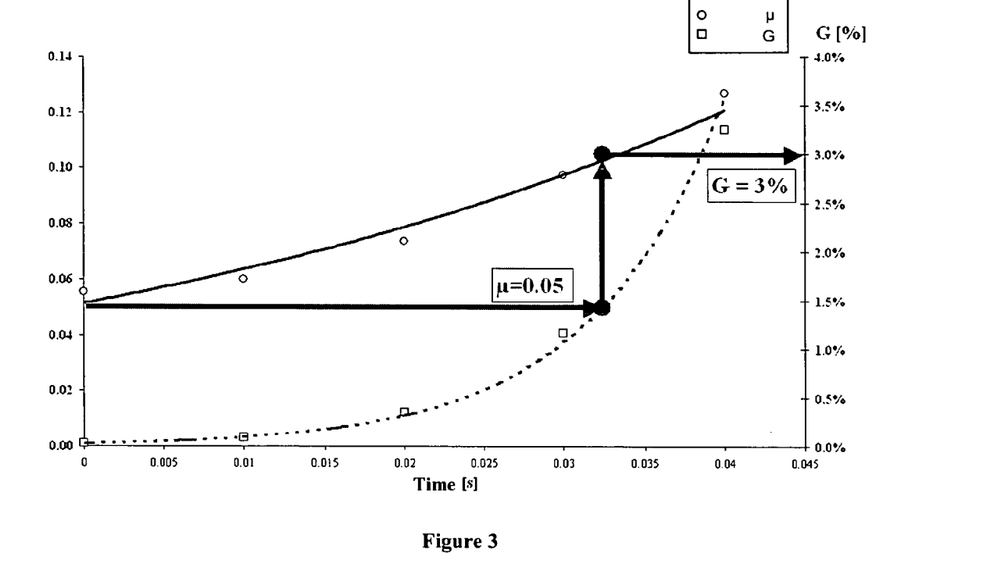
FIG. 3 illustrates the particular processing in more detail.

Before continuing, a few corrections are proposed to the low slip and coefficient of friction values obtained at the very start of a braking maneuver. At the start of braking, it has been found that the curve μ(G) can have a strange behavior. The purpose of this first part of the algorithm is to correct this behavior. In FIGS. 2 and 3, it can be seen that, on wet ground, the foot of the curve μ(G) does not seem to be linear and that, for a zero μ, the slip is not. This is probably due to errors in the value of the slip measured. This is obviously not representative of the physical phenomena in the contact of the tread on the ground. This is a nuisance for the target slip calculation algorithms, which are based on the study of the slope of the curve μ(G). Naturally, this is very dependent on the concrete technological means used on the vehicle for acquiring this information. Consequently, the indications supplied in this context are simple suggestions which it is useful to apply if dealing with this problem, but which are not limiting. More generally, it is useful to correct authoritatively the shape of the foot of the variation curve of the coefficient of friction as a function of the slip if it has a very implausible trend.

The first part of the processing of the data will therefore consist of calculating the value of the slip from which it is possible to use the data for reliably calculating a target slip or the optimum slip. Let this slip be called $G_0$. FIG. 2 shows that this slip $G_0$ is equal to approximately 3%. A more plausible trend of the curve μ(G) is obtained by linking $G_0$ to the substantially linear part of the increasing part of the curve.

Consequently the vehicle stability control system is preferably such that, before all the operations using the curve of variation of $μ_i$ as a function of $G_i$, a correction is carried out of the start of the curve by eliminating the first real pairs ($μ_i$, $G_i$) as long as the variation in $μ_i$ as a function of $G_i$ is not substantially constant and seeking the slip $G_0$ associated with a zero coefficient of friction (this is of course not limiting) such that the pair (0, $G_0$) and the non-eliminated pairs ($μ_i$, $G_i$) are substantially aligned, and using a curve starting from (0, $G_0$) and joining the non-eliminated pairs ($μ_i$, $G_i$), so that, for any value of $G_i$ greater than $G_0$, $G_i$ is replaced by $G_i - G_0$.

For this, for example, an algorithm is used which comprises the following steps:

- systematically eliminating all the slip values associated with a coefficient of friction of less than 0.01;
- continuously calculating regressions of μ and G as a function of time, preferably exponential regressions having regard to the trend of the foot of the curve in the example illustrated by means of FIG. 2 and FIG. 3:

$$μ = e^{A^μ \cdot (t - T^{Start}) + B^μ}, \quad G = e^{A^G \cdot (t - T^{Start}) + B^G}$$

It can be considered that the acquired values represent reality when the estimated or measured coefficient of friction is greater than 0.1 or when the slip exceeds 4%.

FIG. 3 illustrates the way of determining $G_0$ from curves giving the values acquired respectively for the coefficient of friction as a function of time and for the slip as a function of time. The value of the time for which the regression on the curve of μ is equal to a certain value, for example 0.05 (see the horizontal segment between a zero X-axis value and a Y-axis value equal to 0.05 and the dotted-line curve), is sought. The value of $G_0$ will be the value of the regression on the curve of the slip at this moment (see the vertical segment between the point previously obtained and a point on the curve in a continuous line, giving the value of the slip $G_0$).

Therefore, before all the operations using the curve of variation of $\mu_i$ as a function of $G_i$, a correction is carried out of the start of the curve by eliminating the first real pairs ($\mu_i$, $G_i$) as long as the variation in $\mu_i$ as a function of $G_i$ is not substantially constant and finding the slip $G_0$ associated with a zero coefficient of friction such that the pair (0, $G_0$) and the non-eliminated pairs ($\mu_i$, $G_i$) are substantially aligned, and using a curve starting from (0, $G_0$) and joining the non-eliminated pairs ($\mu_i$, $G_i$). Next, in all the algorithms used, for any value of $G_i$ greater than $G_0$, $G_i$ is replaced by $G_i$–$G_0$.

Figure 4:
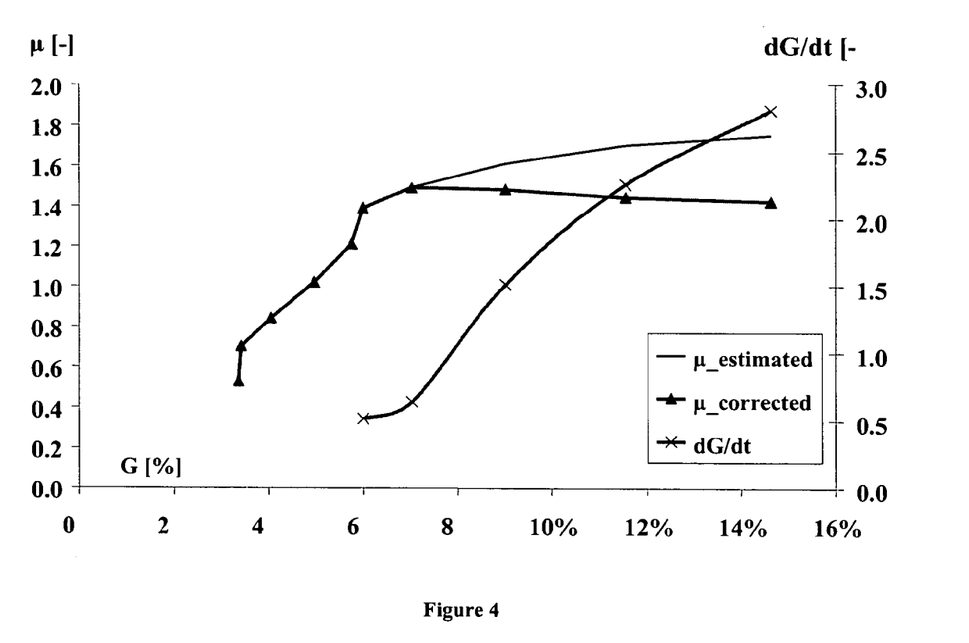
FIG. 4 illustrates another particular processing of the acquisitions of measurements or estimations.

Up till now it has been assumed that values of $\mu$ have been calculated or estimated. However, in certain cases, the method of obtaining the coefficient of friction (from the braking force itself estimated on the basis of the braking pressure having regard to the particular characteristics of each vehicle and from the speed of the wheel) does not give a satisfactory result (the curve $\mu(G)$ calculated is too flat or continuously ascending). It is known that this is not realistic. To correct this problem, a numerical correction of the $\mu$ calculated can be introduced. This correction is based on the rate of change of the slip as a function of time. This is because, if the speed of the wheel (and therefore the slip) takes off quickly, it is because the unstable zone of the curve $\mu(G)$ is involved. Therefore the curve $\mu(G)$ should decrease, which is taken advantage of in a vehicle stability control system in which, when the variation in the slip with respect to time becomes greater than a predetermined threshold of variation, the correction is carried out, before all the operations using the curve of variation of $\mu_i$ as a function of $G_i$, on the end of the curve, replacing the values of $\mu_i$ corresponding to slips taking the variation in the slip with respect to time beyond the predetermined variation threshold, with corrected values as follows:

$$\mu_i^{Corr} = \mu_i^{acquired} \cdot \left[\text{Max}\left(\frac{dG}{dt}; 1\right)\right]^{-ACorr}$$

where "Acorr" is a fine-tuning coefficient and can be specific to each algorithm. For example, a good practical value has proved to be 0.2 for the "Average" algorithm. FIG. 4 illustrates this correction. By virtue of this correction, the curve $\mu(G)$ regains a shape certainly more in accordance with physical reality, which enables the algorithms to produce reliable targets.

It should be noted that, if the value of $\mu_{max}$ is in itself modified by this correction, all the algorithms used are based on the shape of the curve rather than its values. The reader is also referred to the aforementioned patent application where the fact is brought out that the "Invariant" algorithm makes it possible to calculate a slip target without even calculating the exact value of the associated coefficient of friction, the latter being unnecessary to the correct functioning of the slip control of a vehicle wheel.

Selection Between the Target Slips given by the Various Algorithms

Figure 1:
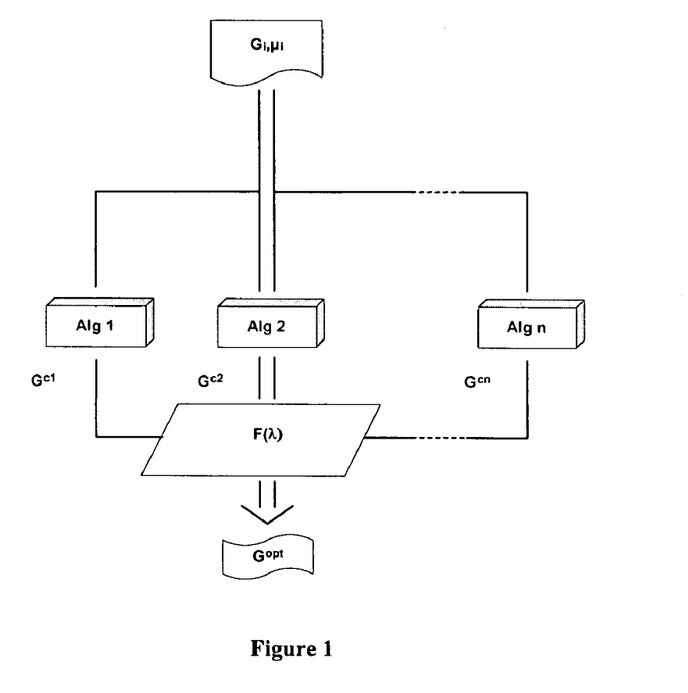
FIG. 1 is an outline diagram of the invention.

Various targets have been calculated by means of the algorithms presented (Invariant, Average, Wet). The general selection principle is illustrated in FIG. 1. It can be seen that measurements or estimations are used, that is to say in general acquisitions of the slip $G_i$ and of the coefficient of slip $\mu_i$, associated with each "i" of the values of the slip. A target value $G^{ci}$ of the slip is calculated at the same time by means of n algorithms Alg "n". Finally, a choice is made amongst these target values by carrying out comparisons using a function $f(\lambda)$ making it possible to find one or more characteristic values of the physical functioning of the rotation of the tire on the ground.

A description will now be given of a non-limiting practical case of implementation of the choice of the final value, that is to say of the optimum slip used for regulating the slip of a tire.

Figure 8:
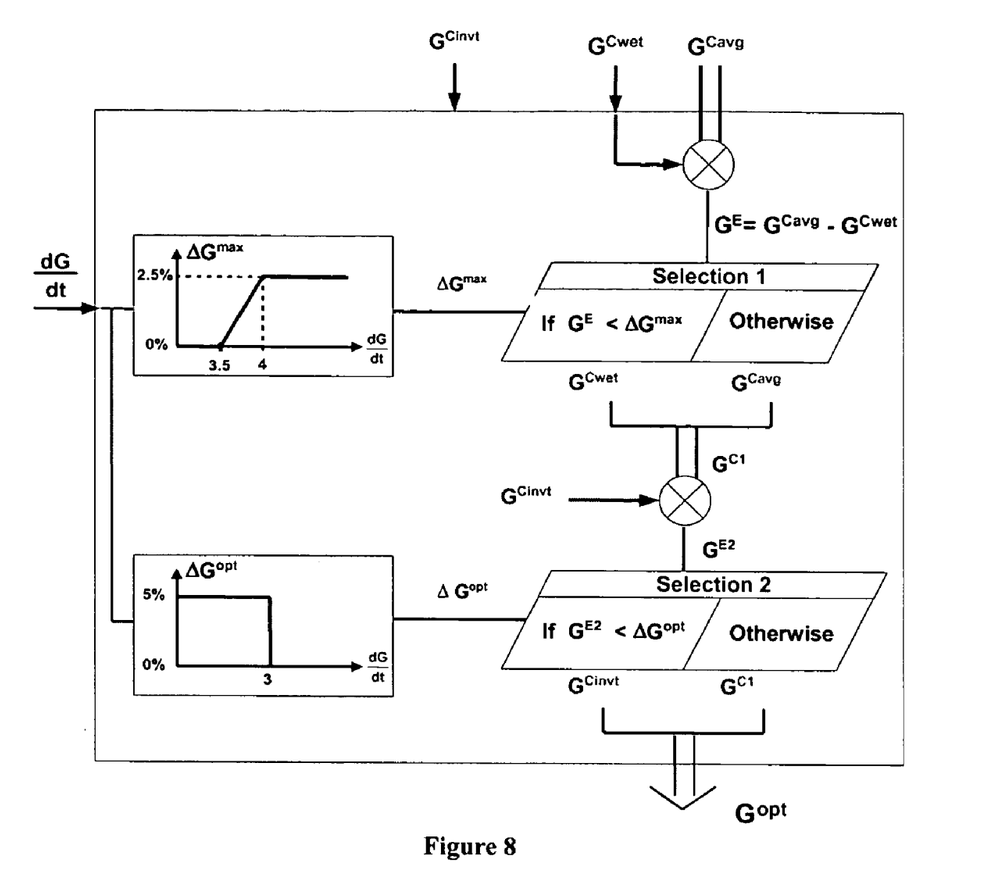
FIG. 8 is a block diagram illustrating an embodiment of the invention.

FIG. 8 illustrates the operations. Here the "Average" algorithm is adopted as a reference which serves to judge the others. The principle of the algorithm of choice between the various targets is based on the fact that one of the targets serves as a reference value which can be trusted whatever the type of ground. The choice will be made from the difference from this reference value and using the derivative of the slip as a function of time $$\left(\frac{dG}{dt}\right)$$

in order to characterize the types of ground.

The selection of the optimum slip, from amongst the target values given by the "Average" and "Wet" algorithms, is made for example in the following manner:

calculating the relative difference in absolute value $G^E$ between $G^{Cavg}$ and $G^{Cwet}$, preselecting a value $G^{C1}$ in the following manner:
  as long as the variation in G with respect to time is within a predetermined zone, adopting, as the value $G^{C1}$, the value of $G^{Cavg}$,
  when the variation in G with respect to time is not in this predetermined zone, a predetermined critical range is determined whose amplitude depends on the variation in G with respect to time, and:
    if $G^E$ is included in the predetermined critical range, adopting, as the value $G^{C1}$, the value of $G^{Cavg}$,
    if $G^E$ is not included in the predetermined critical range, adopting, as the value $G^{C1}$, the value of $G^{Cwet}$, taking as the final selection of the value of the optimum slip $G^{Opt}$ the value $G^{C1}$.

It is advantageous for the predetermined zone to correspond to the variations in the slip G with respect to time below a low limit, and for the predetermined critical range to correspond to the variations in the slip G with respect to time greater than a first critical threshold $\Delta G^{max}$. The low limit and the critical threshold are fine-tuning parameters for the system.

The critical threshold is preferably chosen by a fuzzy-logic process, so as to be variable and best adapted to actual circumstances. Through this process, the value of the threshold can vary as a function of the value of the variation in the slip G with respect to time. Purely by way of illustration, good results have been found by allowing the critical threshold to vary between 0% and 2.5% for a value of the variation in the slip as a function of time varying between 350% (low limit) and 400% per second (high limit), and fixing the critical threshold at 2.5% for values above this high limit.

Next, if an "Invariant" algorithm is used, the last step is replaced with a selection between the above preselection and the target value given by the "Invariant" algorithm, acting as follows:
- if the variation in G with respect to time lies within a predetermined range, then the value of the optimum slip $G^{Opt}$ is equal to $G^{C1}$;
- if the variation in G with respect to time does not lie within the predetermined range and if the difference $G^{E2}$ in absolute value between $G^{Cinvt}$ and $G^{C1}$ lies within a predetermined optimized range, then the value of the optimum slip $G^{Opt}$ is equal to $G^{Cinvt}$;
- if the variation in G with respect to time does not lie within the predetermined range and if the difference $G^{E2}$ in absolute value between $G^{Cinvt}$ and $G^{C1}$ does not lie within the predetermined optimized range, then the value of the optimum slip $G^{Opt}$ is equal to $G^{C1}$.

Advantageously the predetermined range corresponds to the variations in the slip G with respect to time greater than a predetermined threshold of choice and the predetermined optimized range corresponds to the variations in the slip G with respect to time below an optimized threshold $\Delta G^{Opt}$. The thresholds of choice and optimized thresholds are for their part fine-tuning parameters for the system. The optimized threshold can also be chosen by a fuzzy-logic process so as to be variable and best adapted to real circumstances. Purely by way of illustration, good results have been found by fixing the threshold of choice at 300% per second and fixing the optimized threshold at 5%.

It has just been seen that the selection process takes place in two linked steps. The first step involves the "Average" algorithm and the "Wet" algorithm and the second step involves the "Invariant" algorithm. Another process is proposed below for the first and second steps.

The selection of the optimum slip from amongst the target values given by the "Invariant" and "Average" algorithms is made for example in the following manner:
preselecting a value $G^{C1}$ in the following manner:
- if the variation in G with respect to time lies within a predetermined range, then the value $G^{C1}$ is equal to $G^{Cavg}$;
- if the variation in G with respect to time does not lie within the predetermined range and if the difference $G^{E2}$ in absolute value between $G^{Cinvt}$ and $G^{Cavg}$ lies within a predetermined optimized range, then the value $G^{C1}$ is equal to $G^{Cinvt}$;
- if the variation in G with respect to time does not lie within the predetermined range and if the difference $G^{E2}$ in absolute value between $G^{Cinvt}$ and $G^{C1}$ does not lie within the predetermined optimized range, then the value $G^{C1}$ is equal to $G^{Cavg}$;
taking $G^{C1}$ for the final selection of the value of the optimum slip $G^{Opt}$.

Next, if the "Wet" algorithm is used, the last step is replaced with a selection between the above preselection and the target value given by the "Wet" algorithm, operating as follows:
calculating the relative difference in absolute value $G^E$ between $G^{C1}$ and $G^{Cwet}$,
selecting the value of $G^{Opt}$ in the following manner:
- as long as the variation in G with respect to time lies within a predetermined zone, adopting, as the value $G^{opt}$, the value of $G^{C1}$,
- when the variation in G with respect to time does not lie within the predetermined zone, a predetermined critical range is determined whose amplitude depends on the variation in G with respect to time, and:
  - if $G^E$ lies within the predetermined critical range, adopting, as the value $G^{opt}$, the value of $G^{C1}$,
  - if $G^E$ does not lie within the predetermined critical range, adopting, as the value $G^{Opt}$, the value of $G^{Cwet}$.

As already indicated, the various zones and ranges are advantageously chosen with respect to thresholds. These thresholds are, for their part, parameters for fine tuning the system. They can also be chosen by a fuzzy-logic process. Note that what was stated during the first disclosure of a selection process with regard to the critical threshold, threshold of choice and optimized threshold remains valid for this second disclosure of a selection process.

Application to other Phenomena

In the aforementioned patent application, the possibility of other applications of the "Invariant" algorithm was demonstrated, for example to the analysis of the drift thrust developed by a pneumatic tire or elastic solid tire in an operating zone close to the saturation of the drift thrust. It is because of the similarity in the variation laws of these physical phenomena. In the same way, the present invention has broader applications than solely the comparison between the predictions of various algorithms modeling the coefficient of friction according to slip. In order to close the subject, let us simply cite (without even this addition being limiting, as will have been understood) that the invention also applies to a vehicle stability control system aimed at predicting the value of the drift angle $\delta$ of a pneumatic tire where the lateral force (also referred to as the "drift thrust") is at a maximum.

In this case, the parameter P is the drift angle $\delta$ of the tire and the characteristic parameter Q is the drift thrust $F_y$ of the tire. It is a case of predicting when the tire will reach its maximum and therefore will no longer be capable of meeting its prime function, which is to enable the vehicle to turn, in order to be able to maintain the functioning of the tire at a predetermined value of the drift thrust $F_y$, or to warn the driver. To maintain the functioning of the tire at a predetermined target value, it is possible to carry out, possibly automatically, preventive interventions for reducing the speed of the vehicle in order to avoid critical driving situations (if the vehicle is not running as the driver wishes, an accident may result therefrom). In order to carry out these actions advisedly, it is therefore also useful to make a selection between several target values given by various algorithms.

In this case, the invention concerns a system comprising means for controlling a parameter "ξ" according to instructions entered by the driver of the vehicle on his control means and according to instructions delivered by a path controller, the means of modulating the parameter "ξ" and means for calculating the angle of drift parameter $\delta^{Opt}$ whenever means are activated for entering the parameter "ξ" in the following manner:
- each time the system for controlling the variation in ξ is activated, for at least two different levels "i" of drift angle, reading various values of $F_{yi}$ (measured or calculated), and the associated drift angle $\delta_i$ obtained by estimation or direct measurement,
- using in parallel "n" calculation algorithms each determining a target value of the slip and thus obtaining as many target values $\delta^{Cn}$ as there are algorithms used,
- selecting, as the optimum value of the drift angle, the best of the target values $\delta^{Cn}$ by subjecting the "n" target values $\delta^{Cn}$ to comparisons aimed at eliminating the least likely target values.

What is claimed:

1. A vehicle stability control system in which a characteristic parameter Q of a functioning of a tire of the vehicle intended to roll on the ground varies as a function of a parameter P according to a certain law, an optimum value of the parameter P being imposed by a controller directly or indirectly, so as to act on at least one of elements chosen from a group comprising a rotation torque applied to the tire, a steering angle of the tire, a camber angle of the tire and a vertical force applied to the tire, in which the controller comprises means for:
determining estimations or measurements ($P_i$, $Q_i$) for "i" successive levels of values;
using "n" calculation algorithms, each determining a target value for the parameter P, to obtain a target value $P^{Cn}$ for each algorithm,
selecting as the optimum value of the parameter P one of the target values $P^{Cn}$ based at least in part on a comparison of each of the "n" target values $P^{Cn}$ to at least one other one of the "n" target values $P^{Cn}$.

2. A vehicle stability control system, in which a parameter G is a slip of the tire and a characteristic parameter μ is a coefficient of friction of the tire, the system comprising means for imparting a longitudinal force to the tire, means for modulating the longitudinal force, and means for calculating an optimal slip parameter $G^{Opt}$ at each activation of the means for imparting a longitudinal force to the tire, in the following manner:
determining the values of the coefficient of friction $\mu_i$, for each slip $G_i$ corresponding to "i" successive levels of the longitudinal force,
using "n" calculation algorithms, each determining a target value for the slip G, to obtain a target value $G^{Cn}$ for each algorithm,
selecting as the optimum slip value $G^{Opt}$ one of the target values $G^{Cn}$ by subjecting the "n" target values $G^{Cn}$ to comparisons aimed at eliminating the least likely target values.

3. The vehicle stability control system according to claim 2, in which the selection of the optimum slip is made by proceeding with the following operations for each algorithm from 1 to n:
calculating an absolute value of a relative difference between the target $G^{Cn}$ of the algorithm "n" and the target of a previous algorithm $G^{Cn-1}$,
calculating a tolerance range for the calculated relative difference, based on a characteristic value (λ) of physical functioning of rotation of the tire on the ground,
proceeding with the selection of the optimum slip in the following manner:
if the relative difference lies within the tolerance range, selecting $G^{Cn}$ as the value of the optimum slip $G^{Opt}$,
if the relative difference does not lie within the tolerance range, selecting $G^{Cn-1}$ as the value of the optimum slip $G^{Opt}$.

4. The vehicle stability control system according to claim 3, in which the characteristic value λ is the variation in slip G with respect to time.

5. The vehicle stability control system according to claim 4, in which limits of the tolerance range are calculated by a process chosen from a group containing fuzzy logic, Boolean logic and a mathematical function.

6. The vehicle stability control system according to claim 2, in which a first one of the algorithms uses a predetermined Invariant "Invt" and performs the following operations:
determining a slope $\alpha_i$ of a straight line passing through the origin and through ($G_i$, $\mu_i$),
calculating coefficients $A_p$, by direct calculation or by a regression, from a sufficient number of pairs ($\alpha_i$, $G_i$), so as to model a variation curve $\alpha_i = f(G_i, A_p)$,
calculating a first target slip $G^{Cinvt}$ using the predetermined Invariant "Invt".

7. The vehicle stability control system according to claim 6, in which the Invariant is determined in the following manner:

$$Invt = \frac{\frac{\mu}{G}(G_{\max})}{\frac{\mu}{G}(p \cdot G_{\max})},$$

with p having a positive value less than 1.

8. The vehicle stability control system according to claim 7, in which two particular $A_p$ coefficients, A and B, are calculated by a regression chosen from the group consisting of a linear regression and an exponential regression.

9. The vehicle stability control system according to claim 2, in which a second one of the algorithms performs the following operations:
determining coefficients $A_{[avg/p]}$, by direct calculation or by a regression, from a sufficient number of pairs ($\mu_i$, $G_i$), so as to model a first variation curve $\mu_i = f(G_i, A_{[avg/p]})$ including the origin, and the pair or pairs ($\mu_i$, $G_i$), in which $\mu_i$ is different from zero,
determining an indicator of an average slope $\alpha_1$ of the first variation curve,
determining coefficients $B_{[avg/p]}$, by direct calculation or by a regression, from a sufficient number of pairs ($\mu_i$, $G_i$), so as to model a second variation curve $\mu_i = f(G_i, B[avg/p])$ including the pair or pairs ($\mu_i$, $G_i$), in which $\mu_i$ is different from zero,
determining an indicator of an average slope $\alpha_2$ of the second variation curve,
as long as a difference between $\alpha_1$ and $\alpha_2$ is less than a predetermined slope threshold, repeating the previous operations for each new acquisition of a pair of values ($G_i$, $\mu_i$),
if the difference between $\alpha_1$ and $\alpha_2$ exceeds the predetermined slope threshold, determining a target slip $G^{Cavg}$ using at least the last pair of values ($G_i$, $\mu_i$).

10. The vehicle stability control system according to claim 9, in which, when the slip $G_i$ exceeds a predetermined threshold, the target slip $G^{Cavg}$ is determined using at least the last pair of values ($G_i$, $\mu_i$).

11. The vehicle stability control system according to claim 9, in which:
the first variation curve is a first straight line $\mu_i = A_{avg} \cdot G_i$, including the origin, and the pair or pairs ($\mu_i$, $G_i$), obtained by a first linear regression calculating a first coefficient $A_{avg}$, and
the second variation curve is a second straight line $\mu_i = A_{lin} \cdot G_i + B_{lin}$ including the pair or pairs ($\mu_i$, $G_i$), obtained by a second linear regression calculating coefficients $A_{lin}$ and $B_{lin}$.

12. The vehicle stability control system according to claim 9, in which the target slip $G^{Cavg}$ is determined as being equal to the last value $G_i$.

13. The vehicle stability control system according to claim 9, in which the target slip is determined by $$G^{Cavg} = \beta \cdot \frac{\mu^{MAX}}{A^{AVG}},$$

in which β is a fine-tuning parameter.

14. The vehicle stability control system according to claim 13, in which β is equal to approximately 1.04.

15. The vehicle stability control system according to claim 13, in which β is a parameter used in the fine tuning of the system.

16. The vehicle stability control system according to claim 9, in which the predetermined slope threshold for the difference between $\alpha_1$ and $\alpha_2$ is around 30%.

17. The vehicle stability control system according to claim 2, in which a third of the algorithms performs the following operations:
- as the values of $G_i$ are acquired, calculating the variation in G with respect to time,
- as long as the variation is above a low threshold, calculating coefficients $A_{[wet,p]}$, by direct calculation or by a regression, so as to model the variation with respect to time of G by a variation curve which is a function of ($G_i$, $A_{[wet,p]}$),
- when the variation is above a high threshold, determining a third target slip $G^{Cwet}$ using at least the last values of $A_{[wet,p]}$.

18. The vehicle stability control system according to claim 17, in which a linear regression is used, and coefficients $A_{wet}$ and $B_{wet}$ are calculated in the following manner:

$$\frac{dG}{dt} = A^{WET} \cdot G + B^{WET}$$

and the third target slip $G^{Cwet}$ is determined in the following manner:

$$G^{Cwet} = \frac{dG\_tgt - B^{WET}}{A^{WET}}.$$

19. The vehicle stability control system according to claim 18, in which "dG_tgt" is equal to 200% per second.

20. The vehicle stability control system according to claim 18, in which "dG_tgt" is used as a fine-tuning parameter.

21. The vehicle stability control system according to claim 2, in which the means for modulating the longitudinal force acts on a braking control and is initialized (with i=0) at a start of each braking control operation.

22. The vehicle stability control system according to claim 2, in which the means for modulating the longitudinal force acts on a driving torque at the wheels and is initialized (with i=0) at each request for a variation in the driving torque above a predetermined torque threshold.

23. The vehicle stability control system according to claim 2, in which, before obtaining the target values for the slip using a curve comprising the determined values of $\mu_i$ as a function of $G_i$, a correction of a start of the curve is carried out by:
- eliminating from the curve at least a first real pair of values ($\mu_i$, $G_i$), as long as the variation in $\mu_i$ as a function of $G_i$ is not substantially constant,
- seeking the slip $G_0$ associated with a zero coefficient of friction, such that the pair (0, $G_0$) and non-eliminated pairs ($\mu_i$, $G_i$) are substantially aligned, and
- using a curve starting from (0, $G_0$) and joining the non-eliminated pairs ($\mu_i$, $G_i$), so that, for any value of $G_i$ greater than $G_0$, $G_i$ is replaced by $G_i-G_0$.

24. The vehicle stability control system according to claim 2, in which, when the variation in the slip with respect to time becomes greater than a predetermined variation threshold, before obtaining the target values for the slip using a curve comprising the determined values $\mu_i$ as a function of $G_i$, a correction to the end of the curve is carried out, by replacing the values of $\mu_i$ corresponding to the values of slip that result in the variation in the slip with respect to time being beyond the predetermined variation threshold, by corrected values as follows:

$$\mu_i^{Corr} = \mu_i^{acquired} \cdot \left[\text{Max}\left(\frac{dG}{dt}; 1\right)\right]^{-ACorr}$$

where "Acorr" is a preset parameter.

25. The vehicle stability control system according to claim 24, in which "Acorr" is equal to approximately 0.2.

26. The vehicle stability control system according to claim 25, in which "Acorr" is used as a fine-tuning parameter.

27. The vehicle stability control system according to claim 2, wherein a first of the calculation algorithms is an "average" algorithm that detects changes in curvature of a curve μ(G), resulting in a target slip $G^{Cavg}$, and a second of the calculation algorithms is particularly designed for calculating a target slip on wet ground, resulting in a target slip $G^{Cwet}$, and the selection of the optimum slip is made in the following manner:
- calculating a relative difference in absolute value $G^E$ between $G^{Cavg}$ and $G^{Cwet}$,
- preselecting a value $G^{Cl}$ in the following manner:
  - as long as a variation in G with respect to time is within a predetermined zone, adopting, as the value $G^{Cl}$, the value of $G^{Cavg}$,
  - when the variation in G with respect to time does not lie within the predetermined zone, a critical range is determined whose amplitude depends on the variation in G with respect to time, and:
    - if $G^E$ lies within the predetermined critical range, adopting, as the value $G^{Cl}$, the value of $G^{Cavg}$,
    - if $G^E$ does not lie within the predetermined critical range, adopting, as the value $G^{Cl}$, the value of $G^{Cwet}$,
- taking the value $G^{Cl}$ as the final selection of the value of the optimum slip $G^{opt}$.

28. The vehicle stability control system according to claim 27, in which the predetermined zone corresponds to the variations in the slip G with respect to time below a lower limit, and the predetermined critical range corresponds to the variations in the slip G with respect to time above a first critical threshold $\Delta G^{max}$.

29. The vehicle stability control system according to claim 2, wherein a first of the calculation algorithms determines an "Invariant" based on analysis of the coefficient of friction as a function of the slip, resulting in a target slip $G^{Cinvt}$, a second of the calculation algorithms is an "average" algorithm that detects changes in curvature of a curve µ(G), resulting in a target slip $G^{Cavg}$, and a third of the calculation algorithms is particularly designed for calculating a target slip on wet ground, resulting in a target slip $G^{Cwet}$, and the selection of the optimum slip is made in the following manner:

calculating a relative difference in absolute value $G^E$ between $G^{Cavg}$ and $G^{Cwet}$, preselecting a value $G^{Cl}$ in the following manner:

as long as a variation in G with respect to time is within a predetermined zone, adopting, as the value $G^{Cl}$, the value of $G^{Cavg}$, when the variation in G with respect to time does not lie within the predetermined zone, a critical range is determined whose amplitude depends on the variation in G with respect to time, and:

if $G^E$ lies within the predetermined critical range, adopting, as the value $G^{Cl}$, the value of $G^{Cavg}$, if $G^E$ does not lie within the predetermined critical range, adopting, as the value $G^{Cl}$, the value of $G^{Cwet}$, if the variation in G with respect to time lies within a predetermined range, then the value of the optimum slip $G^{Opt}$ is equal to $G^{Cl}$, if the variation in G with respect to time does not lie within the predetermined range and if a difference $G^{E2}$ in absolute value between $G^{Cinvt}$ and $G^{Cl}$ lies within a predetermined optimized range, then the value of the optimum slip $G^{Opt}$ is equal to $G^{Cinvt}$, if the variation in G with respect to time does not lie within the predetermined range and if the difference $G^{E2}$ in absolute value between $G^{Cinvt}$ and $G^{Cl}$ does not lie within the predetermined optimized range, then the value of the optimum slip $G^{Opt}$ is equal to $G^{Cl}$.

30. The vehicle stability control system according to claim 29, in which the predetermined range corresponds to the variations in the slip G with respect to time greater than a predetermined threshold of choice and the predetermined optimized range corresponds to the variations in the slip G with respect to time below an optimized threshold $\Delta G^{opt}$.

31. The vehicle stability control system according to claim 30, in which the critical and optimized thresholds are calculated by a process chosen from the group containing fuzzy logic and Boolean logic and a mathematical function.

32. The vehicle stability control system according to claim 30, in which the low limit, the critical threshold, the threshold of choice and the optimized threshold are fine-tuning parameters.

33. The vehicle stability control system according to claim 2, wherein a first of the calculation algorithms determines an "Invariant" based on analysis of the coefficient of friction as a function of the slip, resulting in a target slip $G^{Cinvt}$, and a second of the calculation algorithms is an "average" algorithm that detects changes in curvature of a curve µ(G), resulting in a target slip $G^{Cavg}$, and the selection of the optimum slip is made in the following manner:

preselecting a value $G^{Cl}$ in the following manner:

if a variation in G with respect to time lies within a predetermined range, then the value $G^{Cl}$ is equal to $G^{Cavg}$, if the variation in G with respect to time does not lie within the predetermined range and if a difference $G^{E2}$ in absolute value between $G^{Cinvt}$ and $G^{Cavg}$ lies within a predetermined optimized range, then the value $G^{Cl}$ is equal to $G^{Cinvt}$, if the variation in G with respect to time does not lie within the predetermined range and if the difference $G^{E2}$ in absolute value between $G^{Cinvt}$ and $G^{Cl}$ does not lie within the predetermined optimized range, then the value $G^{Cl}$ is equal to $G^{Cavg}$, taking $G^{Cl}$ for the final selection of the value of the optimum slip $G^{Opt}$.

34. The vehicle stability control system according to claim 33, in which the predetermined range corresponds to the variations in the slip G with respect to time greater than a predetermined threshold of choice and the predetermined optimized range corresponds to the variations in the slip G with respect to time less than an optimized threshold $\Delta G^{opt}$.

35. A vehicle stability control system wherein a first of the calculation algorithms determines an "Invariant" based on analysis of the coefficient of friction as a function of the slip, resulting in a target slip $G^{Cinvt}$, a second of the calculation algorithms is an "average" algorithm that detects changes in curvature of a curve µ(G), resulting in a target slip $G^{Cavg}$, and a third of the calculation algorithms is particularly designed for calculating a target slip on wet ground, resulting in a target slip $G^{Cwet}$, and the selection of the optimum slip is made in the following manner:

preselecting a value $G^{Cl}$ in the following manner:

if a variation in G with respect to time lies within a predetermined range, then the value $G^{Cl}$ is equal to $G^{Cavg}$, if the variation in G with respect to time does not lie within the predetermined range and if a difference $G^{E2}$ in absolute value between $G^{Cinvt}$ and $G^{Cavg}$ lies within a predetermined optimized range, then the value $G^{Cl}$ is equal to $G^{Cinvt}$, if the variation in G with respect to time does not lie within the predetermined range and if the difference $G^{E2}$ in absolute value between $G^{Cinvt}$ and $G^{Cl}$ does not lie within the predetermined optimized range, then the value $G^{Cl}$ is equal to $G^{Cavg}$, calculating a relative difference in absolute value $G^E$ between $G^{Cl}$ and $G^{Cwet}$, selecting the value of $G^{Opt}$ in the following manner:

as long as the variation in G with respect to time lies within a predetermined zone, adopting, as the value $G^{Opt}$, the value of $G^{Cl}$, when the variation in G with respect to time does not lie within the predetermined zone, a critical range is determined whose amplitude depends on the variation in G with respect to time, and:

if $G^E$ lies within the predetermined critical range, adopting, as the value $G^{Opt}$, the value of $G^{Cl}$, if $G^E$ does not lie within the predetermined critical range, adopting, as the value $G^{Opt}$, the value of $G^{Cwet}$.

36. The vehicle stability control system according to claim 35, in which the predetermined zone corresponds to the variations in the slip G with respect to time below a low limit and the predetermined critical range corresponds to the variations in the slip G with respect to time greater than a first critical threshold $\Delta G^{max}$.

37. The vehicle stability control system according to claim 36, in which the critical and optimized thresholds are calculated by a process chosen from the group containing fuzzy logic and Boolean logic and a mathematical function.

38. The vehicle stability control system according to claim 36, in which the low limit, the critical threshold, the threshold of choice and the optimized threshold are fine-tuning parameters.

39. A vehicle stability control system, in which a parameter P is the drift angle $\delta$ of the tire and a characteristic parameter Q is the drift thrust $F_y$ of the tire, the system comprising means for controlling a parameter "$\xi$" according to instructions entered by a driver of the vehicle on a control means and according to instructions delivered by a path controller, means of modulating the parameter "$\xi$" and means for calculating the drift angle parameter $\delta^{Opt}$ at each activation of the means for entering the parameter "$\xi$" in the following manner:

each time the system for controlling a variation in $\xi$ is activated, for at least two different levels "i" of the drift angle, reading a plurality of values of $F_{yi}$, and the associated drift angle $\delta_i$ obtained by estimation or direct measurement, using "n" calculation algorithms, each determining a target value of the drift angle $\delta$, to obtain a target value $\delta^{Cn}$ for each algorithms, selecting, as the optimum value of the drift angle, one of the target values $\delta^{Cn}$ by subjecting the "n" target values $\delta^{Cn}$ to comparisons aimed at eliminating the least likely target values.

* * * * *

UNITED STATES PATENT AND TRADEMARK OFFICE
CERTIFICATE OF CORRECTION

PATENT NO. : 7,225,072 B2
APPLICATION NO. : 11/039675
DATED : May 29, 2007
INVENTOR(S) : Nicolas Fangeat et al.

It is certified that error appears in the above-identified patent and that said Letters Patent is hereby corrected as shown below:

COLUMN 1

Line 54, "This" should read --This is--.

COLUMN 2

Line 22, "(Pi," should read --($P_i$,--.

COLUMN 5

Line 38, " $G^{Opt} = \frac{-B^{Lin}}{A^{Lin}} \cdot \frac{1 - Invt}{1 - p \bullet Invt}$ ," should read -- $G^{Opt} = \frac{-B^{Lin}}{A^{Lin}} \cdot \frac{1 - Invt}{1 - p \bullet Invt}$ .--.

COLUMN 6

Line 61, "β a" should read --β being a--.

COLUMN 14

Line 36, "B[avg/p])" should read --$B_{[avg/p]}$)--.
Line 55, "$\mu_i = A_{avg \bullet Gi}$," should read --$\mu_i = A_{avg} \bullet G_i$,--.

UNITED STATES PATENT AND TRADEMARK OFFICE
CERTIFICATE OF CORRECTION

PATENT NO. : 7,225,072 B2
APPLICATION NO. : 11/039675
DATED : May 29, 2007
INVENTOR(S) : Nicolas Fangeat et al.

It is certified that error appears in the above-identified patent and that said Letters Patent is hereby corrected as shown below:

<u>COLUMN 20</u>

Line 6, "algorithms," should read --algorithm,--.

Signed and Sealed this

Eighteenth Day of September, 2007

JON W. DUDAS
*Director of the United States Patent and Trademark Office*